United States Patent [19]
Van Dijk

[11] 3,859,531
[45] Jan. 7, 1975

[54] SCINTILLATION CAMERA WITH LIGHT PIPE INSERTS FOR IMPROVED LINEARITY

[75] Inventor: Nicolaas Van Dijk, Zandvoort, Netherlands

[73] Assignee: G. D. Searle & Co., Chicago, Ill.

[22] Filed: Feb. 23, 1973

[21] Appl. No.: 335,026

[52] U.S. Cl.................. 250/366, 250/368, 250/369
[51] Int. Cl............................................... G01t 1/20
[58] Field of Search ........... 250/363, 366, 369, 487, 250/368

[56] References Cited
UNITED STATES PATENTS
2,901,632  8/1959  Stava et al. .......................... 250/487
3,683,180  8/1972  Martone et al. ...................... 250/366

FOREIGN PATENTS OR APPLICATIONS
7,202,290  9/1972  Netherlands

Primary Examiner—James W. Lawrence
Assistant Examiner—Davis L. Willis
Attorney, Agent, or Firm—Walter C. Ramm; Charles H. Thomas; Peter J. Sgarbossa

[57] ABSTRACT

An Anger-type scintillation camera having optically coated transparent cones inserted in conical recesses in the scintillator side of the light pipe directly under the seven central photomultiplier tubes. The coating on the cones is a thin layer of transparent material with a refractive index considerably lower than that of the light pipe. The cones alter the distribution of light from scintillations occurring at various positions under each of the seven central photomultiplier tubes in such a fashion that the resultant response of the camera system shows considerably improved spatial linearity.

3 Claims, 10 Drawing Figures

Patented Jan. 7, 1975
3,859,531
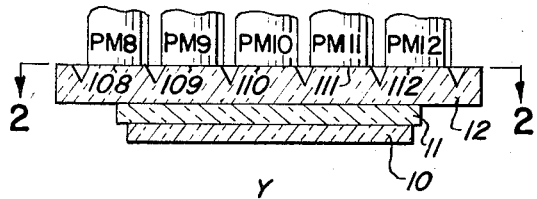
FIG. 1 (PRIOR ART)
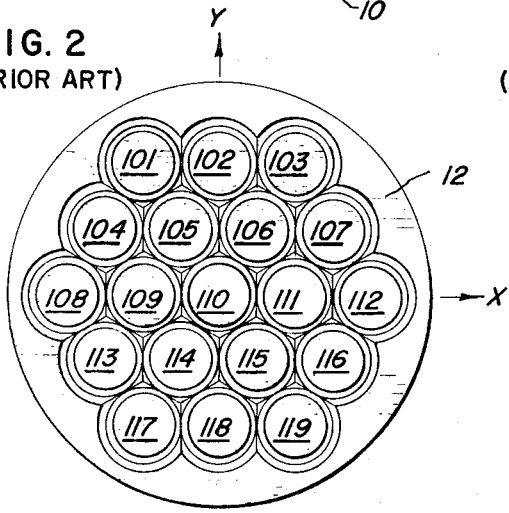
FIG. 2 (PRIOR ART)
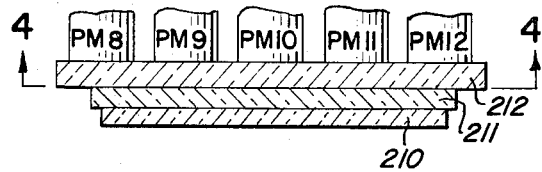
FIG. 3 (PRIOR ART)
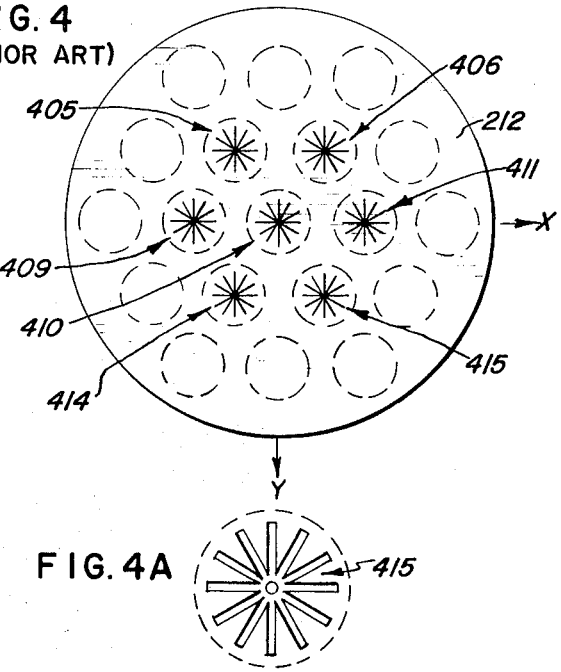
FIG. 4 (PRIOR ART)
FIG. 4A
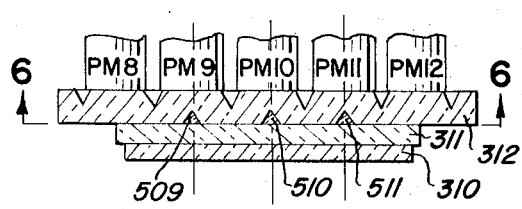
FIG. 5
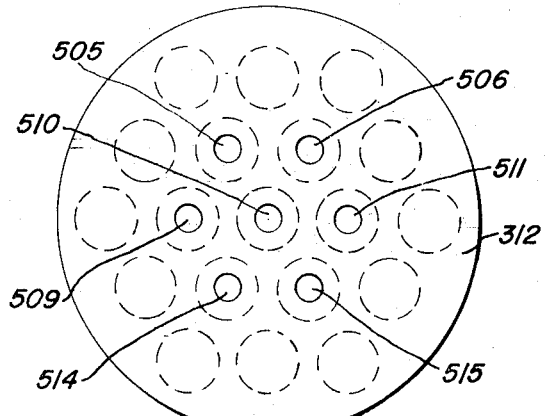
FIG. 6
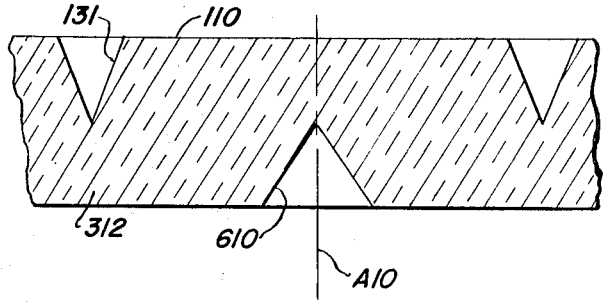
FIG. 7
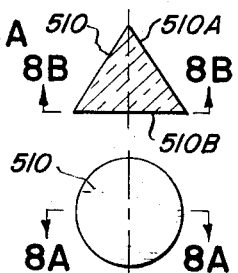
FIG. 8A
FIG. 8B

SCINTILLATION CAMERA WITH LIGHT PIPE INSERTS FOR IMPROVED LINEARITY

Anger-type scintillation cameras (U.S. Pat. No. 3,011,057) are in widespread use in many medical facilities throughout the world. Many improvements in camera performance have been made, most notably improvements in intrinsic spatial resolution. These improvements have enhanced the diagnostic value of these devices. In 1968, improved resolution resulted from employing improved photomultiplier tubes having higher quantum efficiency due to bialkali photocathodes. A dramatic additional improvement in intrinsic resolution was achieved through incorporating non-linear (threshold) preamplifiers as disclosed in a copending application of Kulberg and Muehllehner, Ser. No. 79,861, filed Oct. 12, 1970, now U.S. Pat. No. 3,732,419.

spatial improvements in intrinsic spatial resolution of Anger-type cameras have accentuated one of its inherent characteristics: spatial non-linearity in converting scintillations into position coordinate electrical signals. This spatial non-linearity manifests itself in the following way: an output display of a uniform spatial distribution of gamma rays interacting with the scintillator (typically called a "flood image") comprises a non-uniform patial distribution of dots having a characteristic denser clustering of dots in regions corresponding to locations of central areas of the seven central photomultiplier tubes in a hexagonal array of 19 tubes. This denser clustering results from the observed phenomenon that a gamma ray interaction (i.e., a scintillation) at a particular location in the scintillator near the position of the central axis of a particular one of the central seven tubes results in a displayed dot at a location nearer the axis of the tube than the true location of the interaction. Thus dots tend to bunch up around the areas in the display corresponding to axes of the seven central photomultiplier tubes.

The various approaches which have been taken to compensating for inherent spatial non-linearity to produce a more uniform flood image fall into two general categories: (1) approaches which involve alteration of the light distribution from the scintillator to the photomultiplier tubes by modifications involving one or more of the scintillator, light pipe and photomultiplier tubes; and (2) approaches which involve modification of output signals from the camera. Examples of the first approach are the following:

1. A copending application of Spelha and Krueser, Ser. No. 111,409, filed Feb. 1, 1971, now U.S. Pat. No. 3,723,735, discloses painting all surfaces of the light pipe with a highly light absorbing paint except surfaces mating with the glass cover on the scintillator and the entrance windows of the photomultiplier tubes.

2. A published Dutch patent application No. 7202290 of Picker Corporation, dated Sept. 7, 1972, (not known to the present inventor prior to the date of the present invention) discloses seven relatively opaque light diffusing elements between the glass cover on the scintillator and the light pipe under each of the seven central photomultiplier tubes. Each element comprises 12 equally spaced spokes radiating from a hub which is centered on an axis of one of the tubes with alternate spokes pointing toward an axis of one of the surrounding six photomultiplier tubes.

Examples of the second approach are the following:

1. A copending application of Muehllehner, Ser. No. 196,891, filed Nov. 9, 1971, now U.S. Pat. No. 3,752,982, discloses an approach involving correction of output signals from the camera based on correction factors derived from measurements of the spatial distortion of the system at various locations on the scintillator. Correction is accomplished on either a one-event-at-a-time basis or after an uncorrected map has been stored in core memory in a digital data system.

2. A copending application of Jaszczak, Ser. No. 233,670, filed Mar. 10, 1972, now U.S. Pat. No. 3,746,872, discloses a non-linear array of signal filter windows in conjunction with a scanning gamma ray filter simultaneously to improve resolution and spatial linearity of an Anger-type camera system at some sacrifice in sensitivity.

3. A copending application of van Dijk and Kulberg, Ser. No. 335,327, filed Feb. 23, 1973 discloses seven correction generators each associated with one of the seven central photomultiplier tubes. Each correction generator is active for scintillations produced by gamma ray interactions near its associated tube and produces correction signals which are added to the coordinate signals of the camera to produce corrected coordinate signals which represent more accurately the true spatial coordinates of the gamma ray interaction.

For some of the above-cited examples, it is possible to improve the intrinsic spatial resolution of the camera by locating the photocathodes of the photomultiplier tubes closer to the scintillator and, at the same time, compensate for the increased spatial non-linearity which would otherwise be produced by such alteration of scintillator-photomultiplier tube spacing.

A principal object of this invention is to provide an Anger-type scintillation camera in which improved spatial linearity is achieved by employing a plurality of elements mounted in the light pipe underneath the interiorally located photomultiplier tubes, but not the peripherally located photomultiplier tubes for altering the distribution of light from gamma ray interactions in the scintillator to the photomultiplier tubes in a manner such that the coordinate electrical signals from the camera more accurately represent the coordinates of the gamma ray interaction, each element comprising a regular geometric volume of transparent material having substantially the same index of refraction as the light pipe and having on at least a portion of the surfaces thereof a coating of transparent material having an index of refraction substantially lower than said light pipe.

In particular, this invention features seven conical elements mounted in recesses in the light pipe surface which mates to the glass cover on the scintillator with the axes of the cones aligned with the seven central photomultiplier tubes of a 19 tube array. The cones are constructed of the same material as the light pipe (typically ultraviolet transmitting "Plexiglass") and have the conical surface coated with $Na_5Al_3F_{14}$.

Other objects and features of this invention will be apparent from a consideration of the following detailed description in conjunction with the accompanying drawings which are briefly described as follows:

FIG. 1 is a partly sectioned elevation view of the major components of an Anger-type detector according to prior art;

FIG. 2 is a top view of a light pipe of an Anger-type detector according to prior art;

FIG. 3 is a partly sectioned elevation view of the major components of an Anger-type detector according to the prior art Picker application referenced above;

FIG. 4 is a bottom view of the light pipe of the prior art Anger-type detector according to the Picker application;

FIG. 4A shows an enlarged aspect of a portion of FIG. 4;

FIG. 5 is a partly sectioned elevation view of the major components of an Anger-type detector according to this invention;

FIG. 6 is a bottom view of the light pipe shown in FIG. 5;

FIG. 7 shows a portion of the light pipe construction according to this invention;

FIG. 8A is a section view of a conical element employed in this invention; and

FIG. 8B is a bottom view of the conical element of FIG. 8A.

Referring to FIGS. 1 and 2, the major components of an Anger-type detector are a scintillator 10, a glass cover 11, a light pipe 12, and a bank of photomultiplier tubes (PM8 to PM10 shown). Typically 19 photomultiplier tubes in a hexagonal array are mounted on pads 101 to 119 on light pipe 12. Each pad is formed by cutting circular grooves with V-shaped cross-section into light pipe 12 forming the pattern shown in FIG. 2. With this prior art detector construction and with threshold preamplifiers as taught in the above-referenced Kulberg and Muehllehner application, a flood image tends to contain "hot spots," i.e., a denser clustering of dots, at positions corresponding to the seven central photomultiplier tubes.

Referring to FIGS. 3 and 4, the major components of a Picker Corporation version of an Anger-type detector are a scintillator 210, a glass cover 211, a light pipe 212, and a bank of photomultiplier tubes (PM8 to PM12 shown). Light pipe 212 is thinner and has no pads cut out for photomultiplier tubes. The thinner light pipe places the photomultiplier tubes closer to scintillator 210 which tends to improve spatial resolution but also to increase spatial nonlinearity, producing brighter "hot spots." Opaque light diffusing elements 405, 406, 409, 410, 411, 414, 415, are placed on the bottom of light pipe 212 to improve spatial linearity, i.e., to reduce the "hot spots." These light diffusing elements alter the distribution of light from the scintillator 210 to the photomultiplier tubes by diffusely reflecting light which strikes the underside thereof.

According to this invention, as shown in FIGS. 5, 6, 7, 8A and 8B, a useful alteration of the light distribution from scintillator 310 to photomultiplier tubes (e.g., PM8 to PM12) is accomplished in a completely different manner by employing seven conical elements 505, 506, 509, 510, 511, 514, 515, mounted in light pipe 312 under associated photomultiplier tubes. Each conical element (e.g., 510, FIG. 8A) is constructed of the same material as light pipe 312, and its conical surface 510A has a thin (about 4 microns) coating of $Na_5Al_3F_{14}$ on it. This coating is transparent, but has an index of refraction of about 1.33 which is considerably less than the index of refraction of the material of light pipe 312 and conical element 510. Each conical element (e.g., 510, FIG. 8) fits into a conical recess (e.g., 610, FIG. 7) in light pipe 312 such that its axis is aligned with a photomultiplier tube axis (e.g., A10, FIG. 7).

It is well-known that a mismatch in index of refraction at an interface alters the path of light striking the interface depending upon the angle of incidence of the light. According to this invention, such a mismatch between conical elements (e.g., 510) and a coating thereon produces an alteration in light distribution which reduces the tendency of an Anger-type detector to produce images with hot spots.

In a particular embodiment of this invention, a camera having very noticeable hot spots was improved dramatically by employing seven conical elements with a 20 mm diameter base and a 70° apex angle. The conical elements were mounted into recesses in the light pipe with optical coupling grease such as that used between glass cover 311 and light pipe 312. A 30 mm thick light pipe, and scintillator and glass cover of 15 mm thickness each was employed.

It should be apparent that numerous changes could be made in the specific embodiments of this invention described above without departing from the scope of the invention as claimed in the following claims.

I claim:

1. An improved scintillation camera comprising a single crystal scintillator, a glass cover on said scintillator, a plurality of photomultiplier tubes spaced from said scintillator with overlapping fields of view thereof, a light pipe mounted between said glass cover and said photomultiplier tubes for conducting light from said scintillator to said photomultiplier tubes, circuit means coupled to said photomultiplier tubes for producing coordinate electrical signals representing spatial coordinates of interaction of a gamma ray with said scintillator, and a plurality of elements mounted in said light pipe underneath the interiorally located ones of said photomultiplier tubes for altering the distribution of light from gamma ray interactions in said scintillator to said photomultiplier tubes in a manner such that said coordinate electrical signals more accurately represent said spatial coordinates, each of said elements comprising a regular geometric volume of transparent material having substantially the same index of refraction as said light pipe and having on at least a portion of the surface thereof a coating of transparent material having an index of refraction substantially lower than that of said light pipe whereby said coated surfaces partly or totally reflect or transmit light depending on the angle at which said light strikes said coated surfaces.

2. Apparatus as claimed in claim 1, wherein said regular geometric volume is a cone, said cone being mounted with its axis aligned with an axis of an associated photomultiplier tube and its apex pointed toward said associated photomultiplier tube.

3. Apparatus as claimed in claim 2 wherein said light pipe and said cones are ultraviolet transmitting acrylic plastic material, said coating is $Na_5Al_3F_{14}$, and said cones are mounted in conical recesses in a face of said light pipe mating with said glass cover.

* * * * *